ature is easily maintained within the desired limits by merely halting the introduction of the catalyst whenever the temperature tends to rise too rapidly.

UNITED STATES PATENT OFFICE 2,526,761

ESTERIFICATION PROCESS

Edward John Milbrada, Cumberland, Md., assignor to Celanese Corporation of America, a corporation of Delaware No Drawing. Application December 26, 1947, Serial No. 794,121

7 Claims. (Cl. 260—227)

This invention relates to the production of organic acid esters of cellulose and relates, more particularly, to an improved process for the production of cellulose propionate or other organic acid esters of cellulose in an efficient manner.

An object of this invention is to provide an improved process for the production of organic acid esters of cellulose, such as cellulose propionate, wherein the temperature of the exothermic esterification reaction may be closely controlled and degradation of the cellulose esters kept to a minimum.

Another object of this invention is the provision of an improved process for the esterification of cellulosic materials for the production of organic acid esters of cellulose, such as cellulose propionate, wherein the esterification may be effected rapidly and cellulose esters suitable for use in molding operations may be obtained.

Other objects of this invention will appear from the following detailed description.

In the production of organic acid esters of cellulose, such as cellulose propionate, for example, the cellulose undergoing esterification, may be pretreated with a mixture of acids such as a mixture of formic acid and propionic acid together with a small amount of sulfuric acid to render it more reactive and the pretreated cellulose is then esterified by entering the same into an esterification medium comprising propionic acid anhydride and an esterification catalyst, such as sulfuric acid, which esterification medium may or may not contain added propionic acid. Since the esterification reaction is an exothermic one and excessively high reaction temperatures cause the production of seriously degraded cellulose esters of little commercial value, the heat generated must be removed rapidly so that the temperature will be held within suitable limits. Temperature control may be achieved, for example, by resort to several expedients including refrigerating the liquid reactants prior to charging the cellulose in the reactor, by maintaining the reaction mixture under substantially constant cooling by means of cooling coils within the reactor or by circulating a refrigerant through a jacket surrounding the reactor, and by introducing the cellulose gradually and intermittently so that the heat of reaction will not be generated suddenly. Moreover, since cellulose is a rather bulky material it must be distributed in as finely divided form and as evenly as possible throughout the esterification medium in the reactor in order to avoid localized overheating due to the reaction of relatively large localized masses of cellulose with the esterification medium. Accordingly, the charging of the cellulose is a relatively slow operation and, in spite of such slow and careful introduction of the cellulose, localized over-heating is frequently encountered and hinders the formation of highly uniform, commercially acceptable cellulose propionate or other organic acid esters of cellulose. It will be appreciated that any method whereby the esterification reaction could be carried out so that the reactants might be brought together rapidly while at the same time the temperature of the exothermic esterification reaction could be uniformly maintained under close control would be of substantial commercial value.

I have now found that organic acid esters of cellulose of excellent physical characteristics may be obtained while maintaining close temperature control over the reaction mixture when the reactants are brought together in the reactor by introducing the cellulose to be esterified into a refrigerated reaction medium substantially free of acid esterification catalyst and then gradually introducing the acid esterification catalyst into the reaction mixture with stirring. Since the acid esterification catalyst is in a liquid form, the catalyst may be rapidly and evenly distributed throughout the agitated reaction mixture. The esterification reaction initiated by introduction of the catalyst is, therefore, under close control and localized overheating as encountered when a mass of reactive cellulose undergoes a localized esterification is avoided. The heat generated due to the exothermic nature of the esterification reaction may, therefore, be rapidly distributed throughout the reaction mass so that the temperature is easily maintained within the desired limits by merely halting the introduction of the catalyst whenever the temperature tends to rise too rapidly.

Thus, for example, in the preparation of cellulose propionate in accordance with my novel process, the cellulose to be esterified may be pretreated with a mixture of from 0.2 to 0.4 part, based on the weight of the cellulose, of propionic acid containing from .05 to 0.3 part, based on the weight of the cellulose of formic acid and 0.002 to 0.02 part, based on the weight of the cellulose, of sulfuric acid for from ½ to 16 hours at a temperature of 15 to 35° C. The pretreatment is usually effected by tumbling the cellulose while simultaneously spraying it with the mixture of the pretreating acids so as to achieve a uniform distribution of the acid mixture on the cellulose.

After the introduction of the pretreating acids has been completed, the cellulose is allowed to stand for the desired period at the desired pretreating temperature. The pretreated cellulose may then be introduced with stirring into a suitable reactor containing 3.3 to 4.0 parts, based on the weight of the pretreated cellulose, of propionic acid anhydride which is previously cooled to about −10 to −20° C. The stirring enables the pretreated cellulose to be uniformly distributed throughout the cooled anhydride quite rapidly. Since there is insufficient esterification catalyst present, little or no esterification takes place during the introduction of the pretreated cellulose.

The desired esterification may then be initiated by introducing the esterification catalyst, which is preferably sulfuric acid, into the reactor while the mixture of cellulose and anhydride is being stirred. The sulfuric acid is preferably introduced in the form of a solution in propionic acid anhydride, the amount of catalyst introduced being from about 0.02 to 0.13 part based on the weight of the cellulose with the catalyst solution containing from about 5 to 8 parts by weight of propionic acid anhydride for each part by weight of sulfuric acid.

The introduction of the catalyst mixture is effected gradually while the esterification mixture is being stirred. By regulating the speed at which the catalyst is introduced and by controlling the circulation of the refrigerant through the cooling coils provided in the reactor or through the cooling jacket surrounding the reactor, the temperature may easily be maintained within the desired limits without any danger of localized overheating. In this manner there is obtained cellulose propionate of a very uniform degree of esterification and of a uniform viscosity and which is substantially free of any degraded fractions which limit the commercial utility of the ester.

The temperature of the reaction mass is normally maintained between 5 to 35° C. and should not normally exceed a maximum of about 40° C. during the esterification reaction. The esterification is usually completed in about 3 to 6 hours after the introduction of the catalyst into the reaction mixture has commenced, the total catalyst addition usually requiring but 30 to 90 minutes. The solution of cellulose propionate obtained at the completion of the reaction may then be diluted with 1 to about 3 parts by weight of a 99 to 100% by weight aqueous solution of propionic acid and then 0.5 to 1.7 parts based on the weight of the cellulose of water for ripening are added including any live steam additions. A neutralizing agent such as magnesium acetate, magnesium propionate or magnesium carbonate is added to neutralize all but about 0.005 to 0.02 part by weight of the sulfuric acid based on the weight of cellulose, and the cellulose propionate in solution may then be ripened to the desired solubility characteristics and propionyl value at a temperature of 60 to 100° C.

The ripened cellulose propionates obtained in accordance with my novel process exhibit excellent physical properties and are unusually uniform in chemical composition. They may be employed very satisfactorily for the production of yarns, filaments, films and foils and, due to their excellent viscosity characteristics, are valuable for the preparation of thermoplastic materials suitable for molding into plastic compositions.

In order further to illustrate my invention, but without being limited thereto, the following example is given:

*Example*

500 parts by weight of purified cellulose are sprayed with a mixture consisting of 150 parts by weight of propionic acid (99.7%), 55 parts by weight of formic acid (85%), and 2.75 parts by weight of sulfuric acid (98%), while being tumbled, and the acid mixture allowed to act on the fibers for one hour at a temperature of 25° C. in order to activate the cellulose for subsequent esterification. The pre-treated cellulose is then charged into 2000 parts by weight of propionic acid anhydride (99%) which is previously cooled to −12° C. and, after the resulting mixture is stirred so that the cellulose fibers are uniformly dispersed therein, a mixture of 19.25 parts by weight of sulfuric acid (98%) in 126.5 parts by weight of propionic acid anhydride, at a temperature of 26° C., is gradually added to the resulting mixture of cellulose and propionic acid anhydride over the course of about one hour while stirring. The esterification reaction is complete about two hours after all of the catalyst has been added. The reaction temperature is controlled during the esterification reaction so that it reaches a peak temperature of about 28° C. 1575 parts by weight of 99.7% by weight aqueous propionic acid are then added and mixed thoroughly into the reaction mass and then 275 parts by weight of water for ripening are added. A neutralizing agent comprising magnesium propionate is added together with the water for ripening in an amount sufficient to neutralize the major part of the sulfuric acid and to leave but 2.5 parts by weight of the sulfuric acid present unneutralized.

The diluted mixture is then heated to a temperature of 100° C. by injecting live steam directly into the charge and is then ripened for 1½ hours at this temperature until the cellulose propionate in solution reaches the desired propionyl value. The ripened cellulose propionate is then precipitated from solution by the addition of an excess of water thereto and a cellulose propionate of a propionyl value of 62.7%, calculated as propionic acid, is obtained. The cellulose propionate exhibits excellent stability and clarity and shows relatively little viscosity loss on molding. The total esterification time up to the point at which the water addition for ripening is made is about 6½ hours. The addition of the catalyst to the activated cellulose in the presence of the entire amount of propionic acid anhydride enables the temperature of reaction to be carefully controlled, thus enabling cellulose propionate of excellent viscosity characteristics to be obtained.

While the novel process of my invention has been more particularly described in connection with the preparation of cellulose propionate, other organic acid esters of cellulose such as cellulose acetate, cellulose butyrate and mixed esters such as cellulose acetate-propionate and cellulose acetate-butyrate may also be prepared in accordance with the novel process of my invention.

It is to be understood that the foregoing detailed description is given merely by way of illustration and that many variations may be made therein without departing from the spirit of my invention.

Having described my invention, what I desire to secure by Letters Patent is:

1. In a process for the production of organic acid esters of cellulose wherein cellulose is esterified with a lower fatty acid anhydride employing an acid esterification catalyst, the step which comprises adding the acid esterification catalyst at a controlled rate over a period of from 30 to 90 minutes and with stirring to a lower fatty acid anhydride having cellulose dispersed therein and being substantially free of esterification catalyst, so as to cause the esterification of said cellulose by reaction with said lower fatty acid anhydride.

2. In a process for the production of organic acid esters of cellulose wherein cellulose is pretreated to activate the same and is then esterified with a lower fatty acid anhydride employing an acid esterification catalyst, the step which comprises adding the acid esterification catalyst at a controlled rate over a period of from 30 to 90 minutes and with stirring to a lower fatty acid anhydride having the activated cellulose dispersed therein and being substantially free of esterification catalyst, so as to cause the esterification of said activated cellulose by reaction with said lower fatty acid anhydride.

3. In a process for the production of cellulose propionate wherein cellulose is esterified with propionic acid anhydride employing sulfuric acid as the esterification catalyst, the step which comprises adding sulfuric acid at a controlled rate over a period of from 30 to 90 minutes and with stirring to propionic acid anhydride having cellulose dispersed therein and being substantially free of sulfuric acid, so as to cause the esterification of said cellulose by reaction with said propionic acid anhydride.

4. In a process for the production of cellulose propionate wherein cellulose is pretreated to activate the same and is then esterified with propionic acid anhydride employing sulfuric acid as the esterification catalyst, the step which comprises adding sulfuric acid at a controlled rate over a period of from 30 to 90 minutes and with stirring to propionic acid anhydride having the activated cellulose dispersed therein and being substantially free of sulfuric acid, so as to cause the esterification of said activated cellulose by reaction with said propionic acid anhydride.

5. In a process for the production of cellulose propionate wherein cellulose is pretreated to activate the same and is then esterified with propionic acid anhydride employing sulfuric acid as esterification catalyst, the steps which comprise adding the activated cellulose to a liquid medium consisting of 3.3 to 4.0 parts by weight of propionic acid anhydride on the weight of the cellulose and being substantially free of sulfuric acid and then causing the activated cellulose therein to be esterified by adding a mixture of sulfuric acid and propionic acid anhydride to said medium at a controlled rate over a period of from 30 to 90 minutes while continuously agitating said medium.

6. In a process for the production of cellulose propionate wherein cellulose is pretreated to activate the same and is then esterified with propionic acid anhydride employing sulfuric acid as esterification catalyst, the steps which comprise adding the activated cellulose to a liquid medium consisting of 3.3 to 4.0 parts by weight of propionic acid anhydride on the weight of the cellulose and being substantially free of sulfuric acid and then causing the activated cellulose therein to be esterified by adding a mixture of 0.02 to 0.13 part by weight of sulfuric acid on the weight of the cellulose and 5 to 8 parts by weight of propionic acid anhydride for each part by weight of sulfuric acid to said medium at a controlled rate over a period of from 30 to 90 minutes while continuously agitating said medium.

7. In a process for the production of cellulose propionate wherein cellulose is pretreated to activate the same and is then esterified with propionic acid anhydride employing sulfuric acid as esterification catalyst, the steps which comprise adding the activated cellulose to a liquid medium consisting of 3.3 to 4.0 parts by weight of propionic acid anhydride on the weight of the cellulose cooled to −10 to −20° C. and being substantially free of sulfuric acid and then causing the activated cellulose therein to be esterified by adding a mixture of 0.02 to 0.13 part by weight of sulfuric acid on the weight of the cellulose and 5 to 8 parts by weight of propionic acid anhydride for each part by weight of sulfuric acid to said medium at a controlled rate over a period of from 30 to 90 minutes while continuously agitating said medium so that the reaction temperature does not substantially exceed about 40° C.

EDWARD JOHN MILBRADA.

REFERENCES CITED

The following references are of record in the file of this patent:

UNITED STATES PATENTS

| Number | Name | Date |
|---|---|---|
| 2,033,716 | Kenyon et al. | Mar. 10, 1936 |
| 2,206,288 | Malm | July 2, 1940 |
| 2,345,406 | Malm | Mar. 28, 1944 |
| 2,372,565 | Fothergill | Mar. 27, 1945 |

FOREIGN PATENTS

| Number | Country | Date |
|---|---|---|
| 332,608 | Great Britain | July 17, 1930 |